United States Patent
Ali et al.

(10) Patent No.: US 8,347,952 B2
(45) Date of Patent: Jan. 8, 2013

(54) ENHANCED VENT FOR OUTLET FOR A COOLING SYSTEM

(75) Inventors: Ihab A. Ali, Santa Clara, CA (US); Jay S. Nigen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1200 days.

(21) Appl. No.: 11/607,571

(22) Filed: Nov. 30, 2006

(65) Prior Publication Data

US 2008/0128119 A1 Jun. 5, 2008

(51) Int. Cl.
*H05K 7/20* (2006.01)
*F28F 13/12* (2006.01)

(52) U.S. Cl. .............. 165/122; 165/127; 361/679.47; 361/695

(58) Field of Classification Search ............ 165/80.3, 165/80.4, 104.26, 104.33, 122, 124, 126, 165/127; 361/687–690, 695, 679.47
See application file for complete search history.

(56) References Cited

U.S. PATENT DOCUMENTS

| | | | | |
|---|---|---|---|---|
| 4,632,020 | A * | 12/1986 | Houwer | 454/233 |
| 4,774,631 | A * | 9/1988 | Okuyama et al. | 361/695 |
| 4,911,231 | A * | 3/1990 | Horne et al. | 165/104.34 |
| 5,734,552 | A * | 3/1998 | Krein | 361/695 |
| 6,152,213 | A * | 11/2000 | Suzuki | 165/104.33 |
| 6,154,368 | A * | 11/2000 | Scofield | 361/719 |
| 6,253,834 | B1 * | 7/2001 | Sterner | 165/80.3 |
| 6,288,895 | B1 * | 9/2001 | Bhatia | 361/679.47 |
| 6,299,408 | B1 * | 10/2001 | Bhatia | 415/176 |
| 6,407,916 | B1 * | 6/2002 | Konstad | 361/679.47 |
| 6,564,858 | B1 * | 5/2003 | Stahl et al. | 165/97 |
| 6,587,335 | B1 | 7/2003 | Nelson et al. | |
| 6,644,384 | B2 * | 11/2003 | Stahl | 165/54 |
| 6,712,129 | B1 * | 3/2004 | Lee | 165/104.33 |
| 6,804,115 | B2 * | 10/2004 | Lai | 165/104.33 |
| 6,847,524 | B2 * | 1/2005 | Tomioka et al. | 361/695 |
| 7,589,962 | B1 * | 9/2009 | Bhatia | 361/679.47 |
| 2004/0042184 | A1 * | 3/2004 | Tomioka | 361/752 |
| 2004/0228085 | A1 | 11/2004 | Chen et al. | |
| 2009/0114377 | A1 * | 5/2009 | Zheng et al. | 165/126 |
| 2009/0255654 | A1 * | 10/2009 | Zheng et al. | 165/122 |

FOREIGN PATENT DOCUMENTS

| | | |
|---|---|---|
| EP | 2000227823 | 8/2000 |
| WO | 9834450 | 8/1998 |
| WO | 2004053403 | 6/2004 |

* cited by examiner

*Primary Examiner* — Leonard R Leo
(74) *Attorney, Agent, or Firm* — Park, Vaughan, Fleming & Dowler LLP; Steven E. Stupp

(57) ABSTRACT

A cooling mechanism includes a first heat exchanger, a first fluid-flow port, and a second fluid-flow port. The first heat exchanger includes a forced-fluid driver and is configured to pump heat from inside an enclosed area to outside of the enclosed area. Furthermore, the first fluid-flow port is configured to accommodate a first fluid flow into the enclosed area and the second fluid-flow port is configured to accommodate a second fluid flow from the enclosed area. Note that the first fluid-flow port and the second fluid-flow port are approximately coplanar. In addition, a given fluid-flow port, which may be either or both of the fluid-flow ports, is tapered to have an associated cross-sectional area which is smaller at an edge of the given fluid-flow port that is proximate to the outside of the enclosed area than at an edge of the given fluid-flow port that is proximate to the inside of the enclosed area.

19 Claims, 6 Drawing Sheets

PUMP HEAT BY EXCHANGING FLUID FROM INSIDE AN ENCLOSED AREA TO OUTSIDE OF THE ENCLOSED AREA THROUGH A FIRST FLUID-FLOW PORT AND A SECOND FLUID-FLOW PORT, WHERE THE FIRST FLUID-FLOW PORT AND THE SECOND FLUID-FLOW PORT ARE APPROXIMATELY COPLANAR, AND WHERE THE FIRST FLUID-FLOW PORT AND/OR THE SECOND FLUID-FLOW PORT ARE TAPERED FROM INSIDE OF THE ENCLOSED AREA TO OUTSIDE OF THE ENCLOSED AREA
510

GENERATE A BERNOULLI PUMP ASSOCIATED WITH THE FIRST FLUID-FLOW PORT AND THE SECOND FLUID-FLOW PORT TO AUGMENT THE PUMPING OF HEAT
512

FIG. 5 under the United States Patent US 8,347,952 B2

ENHANCED VENT FOR OUTLET FOR A COOLING SYSTEM

BACKGROUND

1. Field of the Invention

The present invention relates to heat-transfer techniques. More specifically, the present invention relates to fluid-flow ports that reduce recirculation of heated air in computer systems.

2. Related Art

The computational performance provided by electronic devices has increased significantly in recent years. This has caused an increase in power consumption and associated heat generation in these devices. Consequently, it has become a considerable challenge to manage this 'thermal load' to maintain acceptable internal and external operational temperatures.

Portable devices, such as laptop computers (notebook PCs), cellular telephones, and personal digital assistants pose additional design constraints. In particular, size and weight limitations in such devices can make it difficult to achieve desired operational temperatures. For example, many laptop computers utilize cooling systems that include fans to pump heat out of the devices. Unfortunately, space restrictions often lead to partial blockages of the output vents of these fans. This results in increased backpressure, which diverts heated air to the bottom surface and the air input vents of the laptop computer. As a consequence, the bottom surface overheats, which is unpopular with consumers. In addition, heated air re-circulates into the input vents of the laptop computer, thereby reducing the efficiency of the cooling system and increasing the internal temperature.

Hence what is needed are cooling input and output vents for small, narrow, and/or restricted-space cooling systems that overcome the problems listed above.

SUMMARY

One embodiment of the present invention provides a cooling mechanism that includes a first heat exchanger, a first fluid-flow port, and a second fluid-flow port. The first heat exchanger includes a forced-fluid driver and is configured to pump heat from inside an enclosed area to outside of the enclosed area. Furthermore, the first fluid-flow port is configured to accommodate a first fluid flow into the enclosed area and the second fluid-flow port is configured to accommodate a second fluid flow from the enclosed area. Note that the first fluid-flow port and the second fluid-flow port are approximately coplanar. In addition, a given fluid-flow port, which may be either or both of the fluid-flow ports, is tapered to have an associated cross-sectional area which is smaller at an edge of the given fluid-flow port that is proximate to the outside of the enclosed area than at an edge of the given fluid-flow port that is proximate to the inside of the enclosed area.

In some embodiments, the first heat exchanger includes a heat coupling-mechanism, such as convective-cooling fins, coupled to the forced-fluid driver.

In some embodiments, the forced-fluid driver includes a fan.

In some embodiments, the cooling mechanism includes a heat pipe coupled to the first heat exchanger and an integrated circuit coupled to the heat pipe. This heat pipe may be configured to passively diffuse heat from the integrated circuit to the first heat exchanger. In addition, in some embodiments the first heat exchanger is coupled to a first end of the heat pipe and a second heat exchanger is coupled to a second end of the heat pipe. Note that a third fluid-flow port may be configured to accommodate a third fluid flow from the enclosed area. This fluid flow-port may be associated with the second heat exchanger while the second fluid-flow port may be associated with the first heat exchanger.

In some embodiments, the tapering of the given fluid-flow port increases the velocity and lowers the pressure of the associated fluid flow at the edge of the given fluid-flow port that is proximate to the outside of the enclosed area. In particular, the tapering of the first fluid-flow port and/or the second fluid-flow port may create a Bernoulli pump. Such a Bernoulli pump may augment the pumping of heat by the forced-fluid driver.

In some embodiments, the tapering of the first fluid-flow port, the second fluid-flow port, and/or the third fluid-flow port reduces recirculation of heated fluid in the enclosed area. Note that this recirculation may be associated with a hinge mechanism that partially obstructs at least one of the fluid-flow ports. For example, the hinge may be coupled to a display.

In some embodiments, the fluid is a gas and/or a liquid. For example, the gas may include air.

In some embodiments, the enclosed area corresponds to at least a portion of a portable computer.

Another embodiment provides a computer system that includes the cooling mechanism. This computer system may include an integrated circuit that is coupled to the cooling mechanism.

Another embodiment provides a method for cooling the enclosed area. Initially, the cooling mechanism pumps heat by exchanging fluid from inside the enclosed area to outside of the enclosed area through the first fluid-flow port and the second fluid-flow port. Then, the first fluid-flow port and the second fluid-flow port generate the Bernoulli pump.

BRIEF DESCRIPTION OF THE FIGURES

FIG. 5 is a flow chart illustrating a process for cooling an enclosed area in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a cooling mechanism, a computer system (such as a desktop computer and/or a laptop computer) that includes the cooling mechanism, and a method for cooling an enclosed area are described. Note that the computer system may include stationary and/or portable electronic devices, such as cellular telephones, personal digital assistants, game consoles, and MP3 players. This cooling mechanism may include one or more forced fluid-drivers that pump heat from inside the enclosed area to outside of the enclosed area. For example, the one or more forced-fluid drivers may include a fan, the forced fluid may be a liquid and/or a gas (such as air), and the enclosed area may be an enclosure for an electronic device (such as the laptop or portable computer). Furthermore, the cooling mechanism may include input and output fluid-flow ports (such as input and output vents) that are approximately coplanar, and one or more of these fluid-flow ports may have a cross-sectional area that is tapered or reduced from inside-to-outside of the enclosed area. Such a tapered fluid-flow port may create a Bernoulli pump that assists or augments the pumping of heat by the one or more forced-fluid drivers.

In particular, the fluid-flow ports may utilize the Bernoulli effect. This effect may result in a lower pressure and increased fluid-flow velocity at an edge of a tapered fluid-flow port that is proximate to the outside of the enclosed area. This reduced pressure may reduce recirculation of heated fluid thereby reducing a temperature inside of the enclosed area and/or on a bottom surface of an electronic device that includes the cooling mechanism. In some embodiments, one or more of the fluid-flow ports may also direct or steer fluid flow in order to reduce the temperature of the bottom surface.

Note that in some embodiments the cooling mechanism includes a heat coupling-mechanism, such as convective-cooling fins, coupled to the forced-fluid driver. Furthermore, in some embodiments the cooling mechanism includes a heat pipe coupled to one or more of the forced fluid-drivers. This heat pipe may be configured to passively diffuse heat from one or more integrated circuits in the electronic device to one or more of the forced-fluid drivers.

Figure 1:
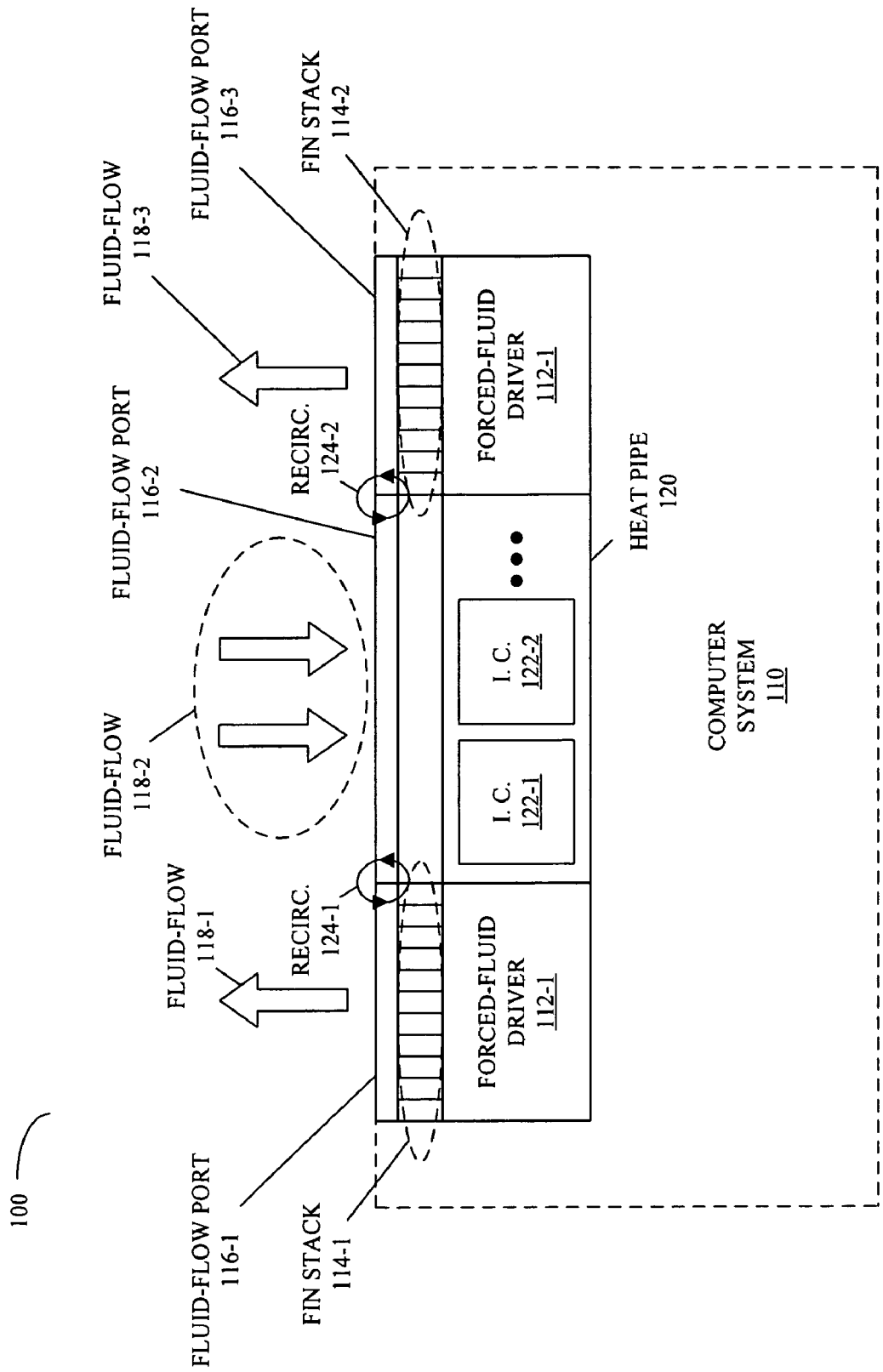
FIG. 1 is a block diagram illustrating a computer system in accordance with an embodiment of the present invention.

We now describe embodiments of the cooling mechanism, the computer system, and the method for cooling the enclosed area. FIG. 1 provides a block diagram illustrating a computer system 110 in accordance with an embodiment 100 of the present invention. Computer system 110 may include one or more integrated circuits 122 that generate heat during operation. One or more heat exchangers in the computer system 110 may pump this heat from an enclosed area in the computer system 110 to an external environment. These heat exchangers may each include a forced-fluid driver, such as forced-fluid driver 112-1, as well as a heat-coupling mechanism or fin stack, such as fin stack 114-1. The forced-fluid drivers 112 may produce fluid flows 118-1 and 118-3 that flow out from the enclosed area through fluid-flow ports 116-1 and 116-3, and fluid flow 118-2 that flows into the enclosed area through fluid-flow port 116-2. In an exemplary embodiment, the forced-fluid drivers 112 each include at least one fan, the fluid flows 118 include a gas, such as air, and the fluid-flow ports may include vents. However, in other embodiments alternate fluid drivers 112 are used. Thus, the fluid flows 118 may include a liquid.

In some embodiments the one or more integrated circuits 122 may be thermally coupled to the forced fluid drivers 112 via a heat pipe 120. For example, the integrated circuits 122 may be coupled to an external surface of the heat pipe 120, and the forced fluid drivers 112 may be coupled to alternate ends of the heat pipe 120. Note that the heat pipe 120 may be a very efficient, passive heat pump or diffuser. In particular, a thermal gradient across the heat pipe 120 may be less than 2 C.

In an exemplary embodiment, the heat pipe 120 has a solid copper jacket with a hollow interior. An inner surface of the jacket may be coated with a thin wick structure that includes copper powder to increase an effective contact area. In addition, the hollow interior may hold a soft vacuum, i.e., may have reduced air pressure. This reduced pressure may allow water to boil more easily during operation of the computer system 110. The resulting water vapor may be very effective in carrying heat from the integrated circuits 122 to the forced fluid drivers 112. As a consequence, the hollow interior of the heat pipe 120 may have an effective thermal conductivity of 5000 W/m/C, which is 100 times larger than that of solid copper.

The heat exchangers may maintain a temperature inside of the computers system 110 and/or on an outer surface of the computer system 110. However, recirculation 124 of heated air back into the enclosed area of the computer system 110 may occur. Such recirculation may increase an internal temperature in the enclosed area. In addition, a temperature of a bottom surface of the computer system 110 (i.e., a portion of an external surface of a housing around the computer system 110) may be increased. These temperature increases may make it difficult to achieve the desired temperature specification of the computer system 110 and may be noticed by users of the computer system 110. For example, if the computer system 110 is a portable computing device (such as a laptop computer), an increase in the temperature of the bottom surface may be readily noticed by users, especially if the users are holding or resting devices on their legs. If the temperature increase is large enough, users may be uncomfortable when using the computer system 110. As a consequence, such temperature increases are unpopular.

Figure 2:
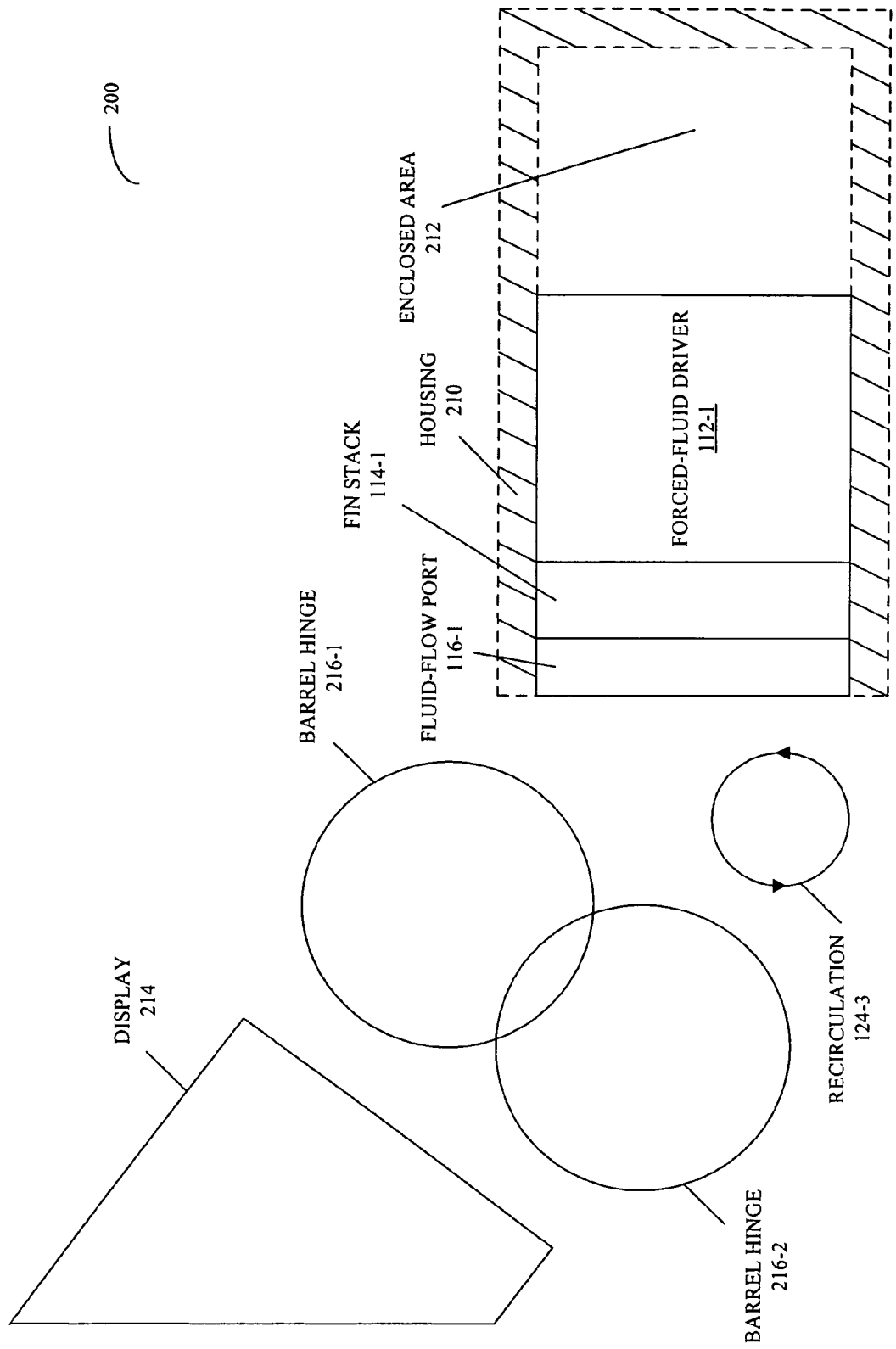
FIG. 2 is a block diagram illustrating a computer system in accordance with an embodiment of the present invention.

A common cause of recirculation, such as the recirculation 124, is a partial blockage of one or more of the fluid flows 118 from the computer system 110. This is illustrated in FIG. 2, which provides a block diagram illustrating a computer system 200 in accordance with an embodiment of the present invention. In the computer system 200, the output fluid flow from fluid-flow port 116-1 blows across a small air gap before being partially blocked by clutch barrel hinges 216. These hinges are coupled to a display 214 in the computer system 200. Note that it may be difficult to avoid such partial blockage in the mechanical layout due to space constraints and aesthetic considerations in the design of the computer system 200. Unfortunately, the partial blockage may exacerbate recirculation 124-3, which may increase the temperature in enclosed area 212 and/or on a bottom surface of housing 210.

Figure 3:
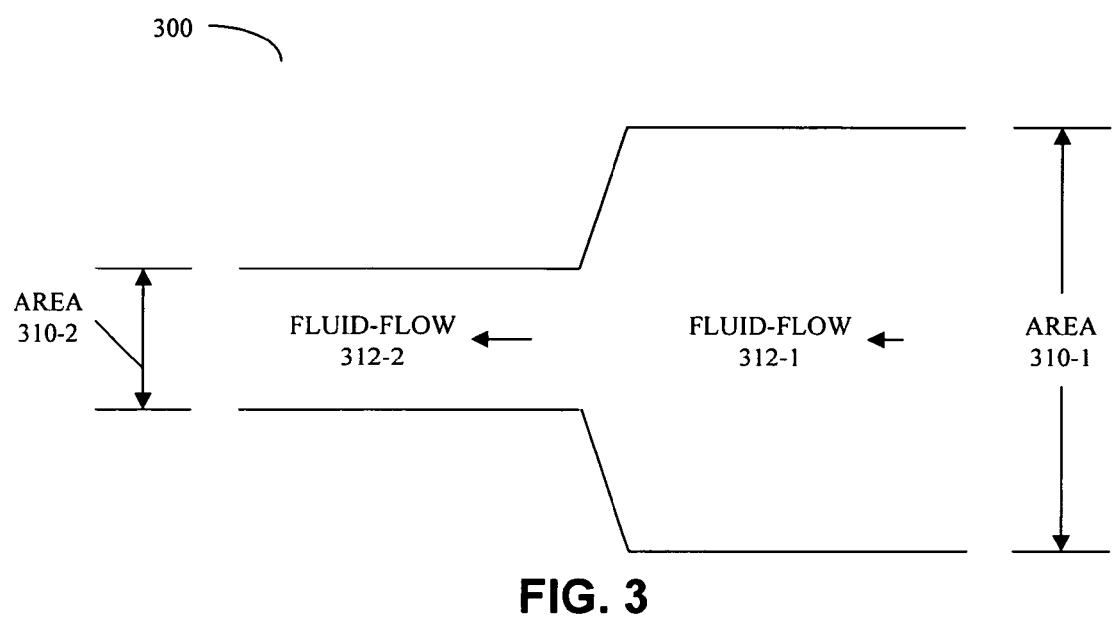
FIG. 3 is a block diagram illustrating a fluid-flow port in accordance with an embodiment of the present invention.

Recirculation 124 may be reduced by appropriate design of the fluid-flow ports 116. This is illustrated in FIG. 3, which provides a block diagram illustrating a fluid-flow port 300 in accordance with an embodiment of the present invention. In the fluid-flow port 300, a cross-sectional area 310-1 which is proximate to the inside of the enclosed area 212 (FIG. 2) is larger than a cross-sectional area 310-2 which is proximate to the outside of the enclosed area 212 (FIG. 2). In exemplary embodiments, the cross-sectional area 310-2 is 20-60% of the cross-sectional area 310-1. Due to conservation of mass, a velocity of fluid flow 312-1 in such a Venturi tube is lower than a velocity of fluid flow 312-2. In addition, due to conservation of energy, a pressure associated with the fluid flow 312-1 is larger than that of the fluid flow 312-2. Therefore, this Bernoulli effect creates a partial vacuum at the output of the fluid-flow port 300 that reduces and/or eliminates recirculation. Note that a similar process also holds for a tapered intake fluid-flow port, such as the fluid-flow port 116-2 (FIG. 1).

Referring back to FIG. 1, therefore by appropriately tapering the cross-sectional area of one or more of the fluid-flow ports 116 and ensuring that the fluid-flow ports 116 are approximately coplanar in the computer system 110 a Bernoulli pump may be created. As discussed further below, such a Bernoulli pump may augment the pumping of heat by the forced-fluid drivers 112 and recirculation 124 of heated fluid may be reduced and/or eliminated. Furthermore, outputs from the fluid-flow ports 116 may be angled or directed (such as upward) away from blockages (such as the barrel hinges 216 in FIG. 2) to reduce the flow of heated fluid onto the bottom surface of the housing 210 (as illustrated by recirculation 124-3 in FIG. 2). Independently or in combination, these design steps may reduce the temperature inside of the enclosed area 212 (FIG. 2) and/or on the bottom surface of the housing 210 (FIG. 2).

Note that in some embodiments the computer system 100 and/or 200 (FIG. 2) includes fewer or additional components, two or more components are combined into a single component, and/or a position of one or more components may be changed. For example, in some embodiments there may be more or fewer forced fluid drivers 112 and/or a direction of the fluid flows 118 may be reversed.

Figure 4A:
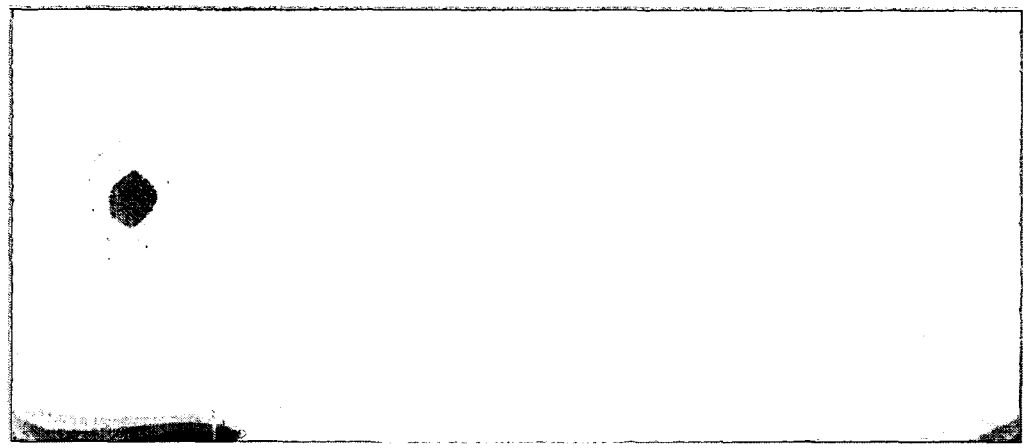
FIG. 4A is block diagram illustrating simulated temperature in a computer system in accordance with an embodiment of the present invention.
Figure 4B:
FIG. 4B is block diagram illustrating simulated temperature in a computer system in accordance with an embodiment of the present invention.

We now describe the results of thermal simulations of a computer system that includes tapered fluid-flow ports. These simulations were performed using commercially available computational fluid dynamics software, such as Icepak™ (from Ansys, Inc., of Canonsburg, Pa.). FIGS. 4A and 4B provide block diagram illustrating a cross-sectional, top view of simulated temperature in computer systems 400 and 450 in accordance with embodiments of the present invention. Computer system 400 includes conventional fluid-flow ports, while computer system 450 includes tapered fluid-flow ports. Note the increased density of thermal contour lines (i.e., the thermal gradient) adjacent to the circular hot spot on the left-hand-side of the computer system 450. This indicates that the tapered fluid-flow ports provide improved cooling. Indeed, the temperature of the bottom surface of a housing of the computer system 450 is 10 C cooler (40 C versus 50 C) in an ambient environment (25 C) with integrated circuits that are consuming 30 W of power that the computer system 400.

We now discuss methods for cooling the enclosed area, such as the enclosed area 212 (FIG. 2). FIG. 5 provides a flow chart illustrating a process 500 for cooling an enclosed area in accordance with an embodiment of the present invention. During this process, heat is pumped by exchanging fluid from inside of an enclosed area to outside of the enclosed area through a first-fluid flow port and a second fluid-flow port (510). Note that the first fluid-flow port and the second fluid-flow port may be approximately coplanar, and the first fluid-flow port and the second fluid-flow port may be tapered from inside of the enclosed area to outside of the enclosed area. Then, a Bernoulli pump associated with the first fluid-flow port and the second fluid-flow port may be generated to augment the pumping of heat (512). Note that in some embodiments there may be additional or fewer operations, the order of the operations may be changed, and two or more operations may be combined into a single operation.

Figure 6:
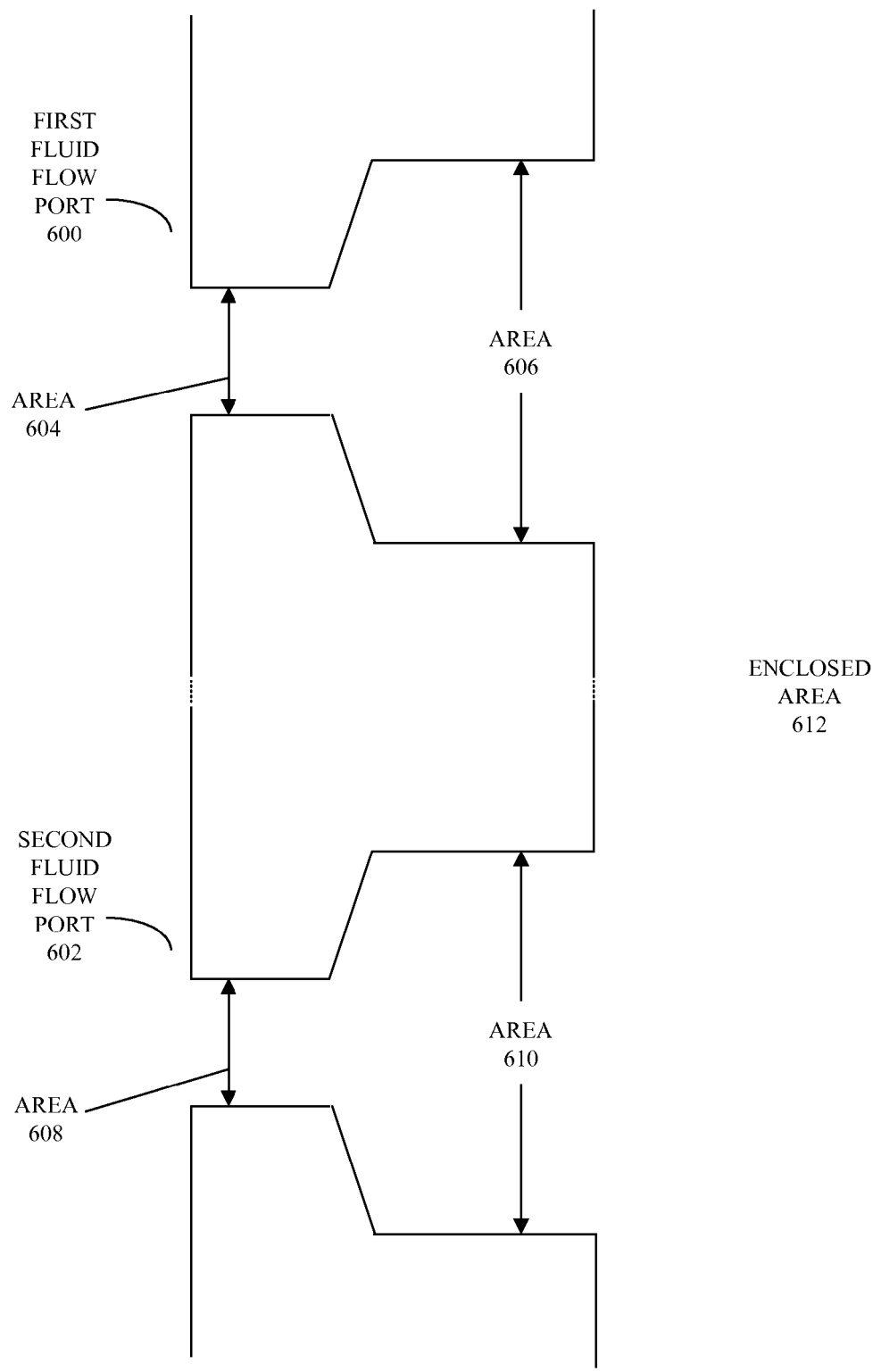
FIG. 6 presents a block diagram illustrating a first fluid flow port and a second fluid flow port in accordance with an embodiment of the present invention.

FIG. 6 presents a block diagram illustrating a first fluid flow port 600 and a second fluid flow port 602 in accordance with an embodiment of the present invention. As can be seen in FIG. 6, both first fluid-flow port 600 and second fluid-flow port 602 are tapered to have an associated cross-sectional area (areas 604 and 608, respectively) which is smaller at an edge which is proximate to the outside of enclosed area 612 than at an edge which is proximate to the inside of enclosed area 612 (areas 606 and 610, respectively). Note that FIG. 6 is one embodiment, other embodiments may have fluid flow ports 600 and 602 arranged and/or placed differently.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A cooling mechanism comprising:
   a first heat exchanger including a forced-fluid driver, wherein the first heat exchanger is configured to pump heat from inside an enclosed area to outside of the enclosed area;
   a first fluid-flow port configured to accommodate a first fluid flow into the enclosed area; and
   a second fluid-flow port configured to accommodate a second fluid flow from the enclosed area,
   wherein the first fluid-flow port and the second fluid-flow port are approximately coplanar, and
   wherein both of the first fluid-flow port and the second fluid-flow port, are tapered to have an associated cross-sectional area which is smaller at an edge of the respective fluid-flow port which is proximate to the outside of the enclosed area than at an edge of the respective fluid-flow port which is proximate to the inside of the enclosed area, wherein the tapering of the first fluid-flow port and the second fluid-flow port reduces recirculation of heated fluid in the enclosed area.

2. The cooling mechanism of claim 1, wherein the first heat exchanger further includes a heat coupling-mechanism coupled to the forced-fluid driver.

3. The cooling mechanism of claim 2, wherein the heat coupling-mechanism includes convective-cooling fins.

4. The cooling mechanism of claim 1, wherein the forced-fluid driver includes a fan.

5. The cooling mechanism of claim 1, further comprising:
   a heat pipe coupled to the first heat exchanger; and
   an integrated circuit coupled to the heat pipe,
   wherein the heat pipe is configured to passively diffuse heat from the integrated circuit to the first heat exchanger.

6. The cooling mechanism of claim 5, further comprising a second heat exchanger, wherein the heat pipe has a first end and a second end, and wherein a given heat exchanger is coupled to a given end of the heat pipe.

7. The cooling mechanism of claim 6, further comprising a third fluid-flow port which is configured to accommodate a third fluid flow from the enclosed area, wherein the second fluid-flow port is associated with the first heat exchanger and the third fluid-flow port is associated with the second heat exchanger.

8. The cooling mechanism of claim 1, wherein the tapering of the respective fluid-flow port increases the velocity and lowers the pressure of the associated fluid flow at the edge of the respective fluid-flow port proximate to the outside of the enclosed area.

9. The cooling mechanism of claim 1, wherein the tapering of the first fluid-flow port and the second fluid-flow port creates a Bernoulli pump.

10. The cooling mechanism of claim 9, wherein the Bernoulli pump augments the pumping of heat by the forced-fluid driver.

11. The cooling mechanism of claim 1, wherein the recirculation is associated with a hinge mechanism partially obstructing at least one of the fluid-flow ports.

12. The cooling mechanism of claim 11, wherein the hinge mechanism is coupled to a display.

13. The cooling mechanism of claim 1, wherein the fluid is a gas.

14. The cooling mechanism of claim 13, wherein the gas includes air.

15. The cooling mechanism of claim 1, wherein the fluid is a liquid.

16. The cooling mechanism of claim 1, wherein the enclosed area corresponds to at least a portion of a portable computer.

17. The cooling mechanism of claim 1, wherein the cross-sectional area of a respective fluid-flow port is tapered by 20-60%.

18. A method for cooling a enclosed area comprising:
pumping heat by exchanging fluid from inside the enclosed area to outside of the enclosed area through a first fluid-flow port and a second fluid-flow port; and
generating a Bernoulli pump associated with the first fluid-flow port and the second fluid-flow port to augment the pumping of heat,
wherein the first fluid-flow port is configured to accommodate a first fluid flow into the enclosed area,
wherein the second fluid-flow port is configured to accommodate a second fluid flow from the enclosed area,
wherein the first fluid-flow port and the second fluid-flow port are approximately coplanar, and
wherein both of the first fluid-flow port and the second fluid-flow port, are tapered to have an associated cross-sectional area which is smaller at an edge of the respective fluid-flow port which is proximate to the outside of the enclosed area than an edge of the respective fluid-flow port which is proximate to the inside of the enclosed area, wherein the tapering of the first fluid-flow port and the second fluid-flow port reduces recirculation of heated fluid in the enclosed area.

19. A computer system, comprising:
an integrated circuit;
a cooling mechanism coupled to the integrated circuit, the cooling mechanism including:
a first heat exchanger including a forced-fluid driver, wherein the first heat exchanger is configured to pump heat from inside an enclosed area to outside of the enclosed area;
a first fluid-flow port configured to accommodate a first fluid flow into the enclosed area; and
a second fluid-flow port configured to accommodate a second fluid flow from the enclosed area,
wherein the first fluid-flow port and the second fluid-flow port are approximately coplanar, and
wherein both of the first fluid-flow port and the second fluid-flow port, are tapered to have an associated cross-sectional area which is smaller at an edge of the respective fluid-flow port which is proximate to the outside of the enclosed area than at an edge of the respective fluid-flow port which is proximate to the inside of the enclosed area, wherein the tapering of the respective fluid-flow port reduces recirculation of heated fluid in the enclosed area.

* * * * *